Figure 1:
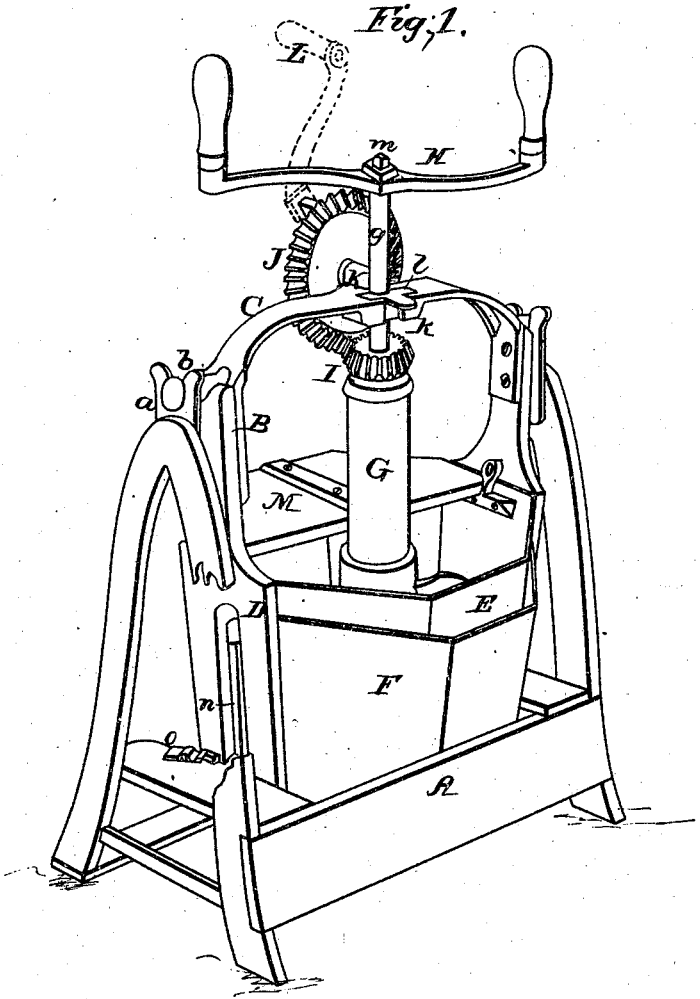

No. 80,624. PATENTED AUG. 4, 1868.

S. L. HALL.
CHURN AND BUTTER WORKER.

Witnesses;
L. Hailer.
P. T. Dodge

Inventor;
S. L. Hall
by Dodge & Munn
his atty's

United States Patent Office.

SAMUEL L. HALL, OF WEST SALEM, WISCONSIN.

Letters Patent No. 80,624, dated August 4, 1868.

IMPROVEMENT IN CHURN AND BUTTER-WORKER.

*The Schedule referred to in these Letters Patent and making part of the same.*

TO ALL WHOM IT MAY CONCERN:

Be it known that I, SAMUEL L. HALL, of West Salem, in the county of La Crosse, and State of Wisconsin, have invented certain new and useful Improvements in Churns and Butter-Workers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to churns, and consists in the construction of a novel machine for keeping the cream at any desired temperature while being churned, and for drawing off the buttermilk after the butter is gathered, as well as for working the butter in the churn, and washing it, &c.

In the drawings—

Figure 2:
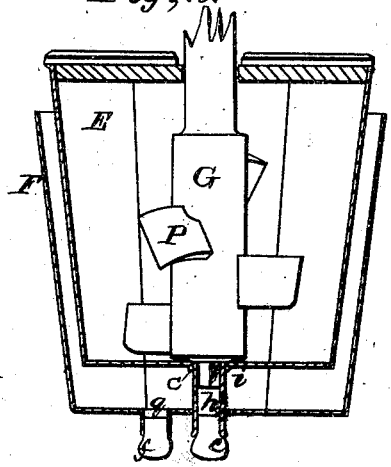

Figure 1 is a perspective view of my machine, with a portion of the frame broken away, and Figure 2 is a transverse vertical section of a portion of fig. 1, detached.

In constructing my machine, I make a strong frame, A, and suspend, in open bearings, a, attached to its upper sides, a frame, B, by means of journals b, as shown in fig. 1.

The frame B consists of a metallic cross-piece, C, with two vertical pieces D attached, as shown in fig. 1, of wood. To these vertical pieces D, I attach a galvanized iron churn, E, made octagonal, or any other desired shape, and to the same pieces a similarly-shaped vessel, F, sufficiently large to allow the churn E to set within it, and leave an open space between them for the introduction of warm water as shown in figs. 1 and 2. I provide the interior vessel or churn E, at the centre of its bottom, with a hole, c, and from it extend a tube, d, to and through the bottom of the exterior vessel F, and insert in its end a plug, e, and in like manner I provide the exterior vessel F with an opening, q, having a plug, f, all as shown clearly in fig. 2.

Within the churn E, I place a vertical dasher, G, having a series of curved beaters p along its sides, and with a pin, h, in its lower end to enter the hole c, and grooved at i so as to allow the water or buttermilk to flow through it when the plug e is removed; also with a shaft, g, rigidly attached to its upper end, and placed in its bearings in the cross-piece C, by passing laterally through a slot, k, and held in place by a T-shaped block l. To the upper end of the shaft g, I attach a double lever or brake, H, by a common nut, n, with handles to operate it; and below the cross-bar C, I key to the same shaft g, a bevel-pinion, I, which gears into a bevel-wheel, J, mounted on an arm, K rigidly connected to and extending at right angles with the cross-bar C.

The bevel-wheel J, I operate with a winch, L, as clearly shown in fig. 1.

The churn E, I provide with covers M, which can be removed when desired. In the drawing, fig. 1, only one of the covers is shown, the other being off.

In the vertical side-piece D, to which the vessels E and F are attached, I place a small thermometer, n, so as to see at a glance the temperature, and on the frame A, a button or other convenient device o, for holding the frame B in place, and so as to prevent it from swinging in its bearings unless desired.

In operating my machine, I first place the cream in the churn E, and put on the covers M, then pour water of any desired temperature within the vessel F, about the churn E. The temperature of the whole can be readily seen by means of the thermometer n, and regulated accordingly. Then turn the winch L, which, through the bevel-wheel J and bevel-pinion I, will cause the dasher G to revolve, and by means of the beaters p thoroughly agitate the cream. As soon as the butter has come, the winch L, I remove, and put on the brake H, and by moving it back and forward gather and work the butter. At any time desired, by turning the button o, the lower ends of the vessels E and F can be swung out, and the plugs f and e taken out, and the water and buttermilk be drawn off. After the buttermilk is thus drawn off, the butter can be still further worked and washed if desired, before being removed from the churn. In order to have free access to the interior of the churn, the dasher G can be easily taken out by removing the T-shaped block l, and passing the shaft g laterally through the slot k. In this way I am able to construct a cheap and convenient churn, so arranged that the cream when churned can be kept at any desired temperature, and the butter gathered and worked with ease and facility.

Having thus described my invention, what I claim, is—

1. The metal churn E, with the exterior vessel F, both attached to the frame B, suspended in the frame A, provided with the locking-device o, all constructed and arranged to operate substantially as herein described and for the purpose set forth.

2. In combination with the bevel-wheel J and winch L, the dasher G, with the curved beaters p, and grooved pin h, bevel pinion I, and brake H, all constructed and arranged to operate substantially as herein described and for the purpose set forth.

SAMUEL L. HALL.

Witnesses:
    H. J. PECK,
    P. S. ELWELL.